April 28, 1953 W. C. ROGERS 2,636,560
TIMED VALVE
Filed June 17, 1950 2 SHEETS—SHEET 1
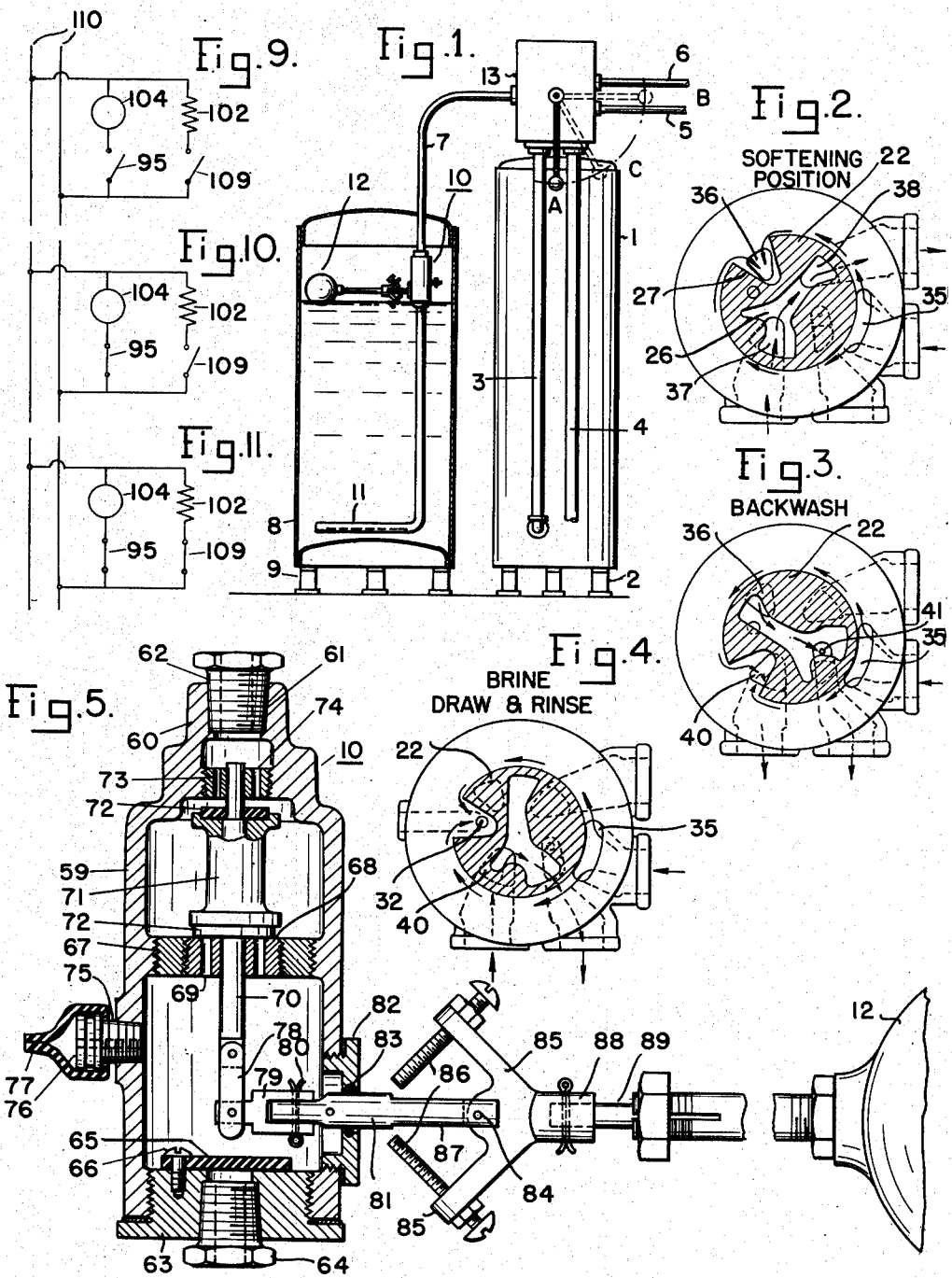
INVENTOR
WALSTINE C. ROGERS
BY
ATTORNEYS.

April 28, 1953 W. C. ROGERS 2,636,560
TIMED VALVE
Filed June 17, 1950 2 SHEETS—SHEET 2
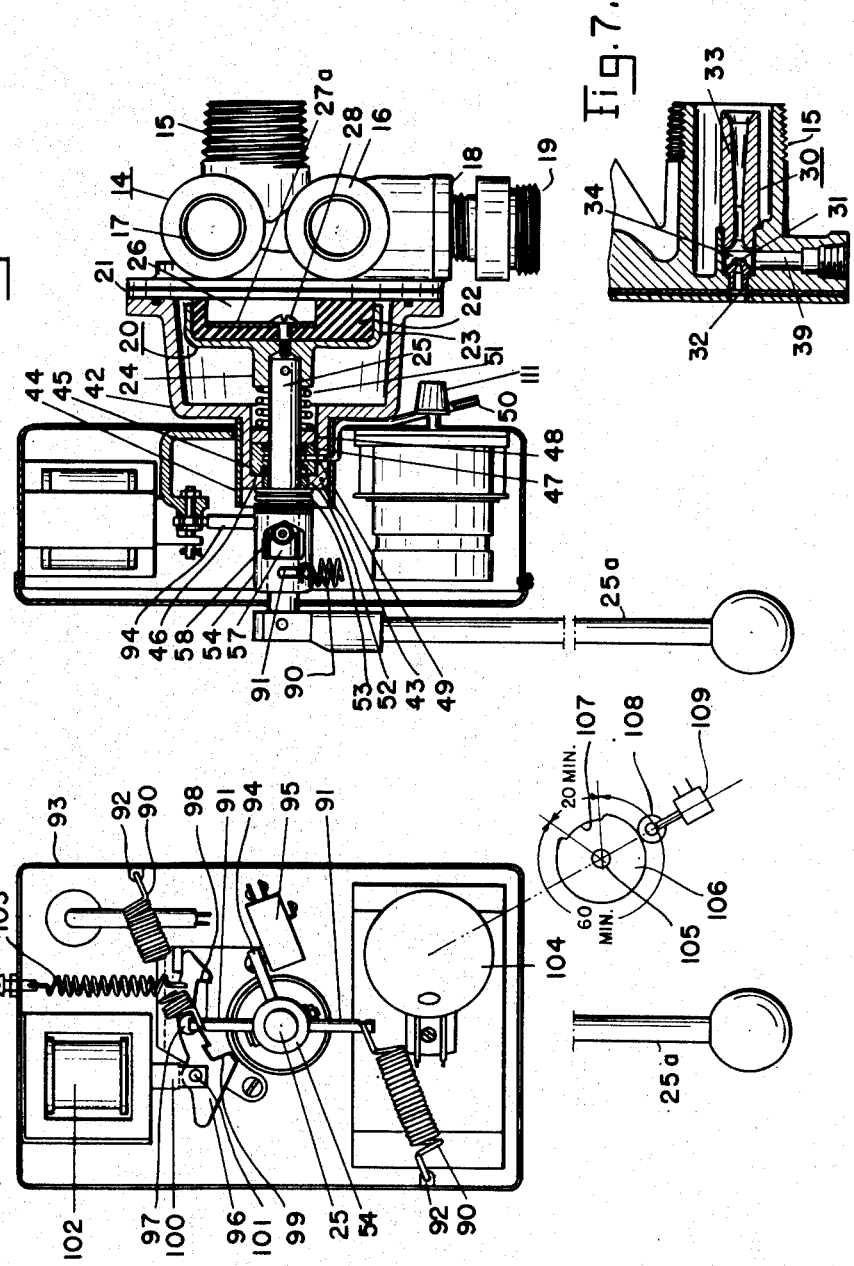
INVENTOR
WALSTINE C. ROGERS
BY
 Toulmin & Toulmin
ATTORNEYS.

Patented Apr. 28, 1953

2,636,560

UNITED STATES PATENT OFFICE 2,636,560

TIMED VALVE

Walstine C. Rogers, Dayton, Ohio, assignor to The Duro Co., Dayton, Ohio, a corporation of Ohio Application June 17, 1950, Serial No. 168,748

6 Claims. (Cl. 161—7)

The present invention relates to water softeners of the base exchange type, and more particularly to semi-automatic softeners wherein regeneration is intiated by hand but the softener is controlled through the rest of its regeneration cycle by a timing device.

It is customary in softeners of this type to provide a valve head at the top of the softener for making the inlet and outlet connections to each of the softener tank, the brine tank and the drain. A heavy apertured or recessed plate of any suitable material is employed for this purpose, the plate being adapted to be rotated partially by hand and partly automatic within the valve head. The openings or recesses within the plate form inter-connecting passageways and are so arranged that when the plate is rotated, the various fluid connections are selectively made to the incoming and outgoing conduits.

It is apparent that a plate of this character must be held tightly against the face of the valve in order to withstand the pressure of the water flowing into and out of the softener. Considerable friction develops between the plate and valve face so that during repeated rotary movements of the plate, as when the softener is being regenerated, excess wear is normally caused at the abutting surfaces.

Moreover, these valve parts are subjected to brine solutions and hard water, all of which tend to leave deposits between the movable surfaces which additionally increases the friction between the parts over a period of time. Except for the manual or initial operation by which the parts are set to regenerate, the latter are caused to move automatically in response to the action of the low power electromagnet and tripping levers and springs so that friction between the moving parts must be kept at a minimum.

The primary object of the invention is to provide a softener of the semi-automatic type in which the various movable parts operable during the regeneration period are kept movable with the minimum amount of power in order that the automatic operation of the softener remains reliable and efficient.

Another object is to provide a softener of the semi-automatic regeneration type in which the parts immediately associated with the control or change of water connections are improved from the standpoint of reducing friction and facilitating the control movements.

Still another object is to provide a water softener of the semi-automatic regeneration type in which the regeneration period and the operation of the parts during that period are improved.

These objects are attained, in brief, by providing a combined manual and automatic actuator for controlling the position of the conduit selecting plate and in which the movable parts are cammed away from the stationary parts during the regeneration cycle in order to minimize surface friction and to discourage the deposit of salt and other deleterious substances between the moving parts.

Other objects and features will be apparent as the specification is perused in connection with the accompanying drawings, in which:

Figure 1 is a view of the improved softener showing some of the parts in elevation and the tank in section to expose the float valve;

Figure 2 is a fragmentary detailed view taken across the rotary valve to indicate the position of the valve parts when the softener is furnishing treated service water;

Figure 3 shows the same parts as in Figure 2, but during the back-wash operation;

Figure 4 diagrammatically indicates the manner in which the valve plate has been moved to effect the brine draw and rinse;

Figure 5 illustrates a level float that can be used to advantage with the improved softener for controlling the supply of brine;

Figure 6 represents a sectional view of the valve assembly parts and the actuator, including the electromagnet and timing motor;

Figure 7 is a fragmentary sectional view of a jet employed in connection with the softener; and Figure 8 is a plan view of the interior of the casing which houses the electromagnet, the timing motor and various tripping levers, the cover of the casing being removed.

The invention contemplates the provision of a water softener of the base exchange type, wherein the regeneration cycle is initiated by a hand-operated lever and then the various changes in connections to the back-wash, brine draw and rinse, and finally, restoration to the softening position is effected automatically by a timing motor, an electromagnet and the necessary tripping levers.

In Fig. 1, reference character I designates a water softener tank of any suitable type mounted on pedestals 2. The tank contains the usual bed of zeolite crystals or similar material for extracting the salts and other hardening agents out of the water that passes through the softener. The softener is of the down-flow type except during back-wash and there is a single supply pipe (not shown) extending into the tank and terminating a short distance above the mineral bed. There is a discharge pipe 3 connected to the lower end of the tank for carrying the water after it has passed through the mineral bed. The usual form of drain pipe 4 is also provided, the latter being employed during the regeneration cycle, as will be explained more fully hereinafter.

The supply of hard or holly water is furnished through a pipe 5 and the outgoing or service softened water passes through a pipe 6. The brine solution is fed into the mineral bed during regeneration through a pipe 7 extending from a brine tank 8. The tank is positioned on a pedestal 9 at approximately the same height as the softener tank 1. The pipe 7 is provided with a shut-off valve, generally indicated at 10, of which the details are illustrated in Fig. 5 and will be explained hereinafter.

Beyond the valve the pipe is provided with a horizontally positioned portion 11 extending across the bottom of the brine tank and having a slit along the bottom surface of this horizontal extension for permitting the brine to enter the pipe as is well known in the art.

The on and off positions of the valve 10 are controlled by a liquid level float 12 which will also be described in detail in connection with Fig. 5.

During the regeneration cycle, which includes change-over from the softening to the backwash, to the brine draw and rinse, and finally, back to the softening position, a valve assembly indicated generally at 13 is employed, the details of which are shown in Figs. 2, 3, 4 and 6 to 8. This valve assembly 13 also includes a conduit head, indicated generally at 14 (Fig. 6), and both the valve assembly and the conduit head are supported at any suitable position with respect to the tank by means of the pipe which extends into the tank and is threaded to the conduit head at the threads 15.

The hard water service pipe enters the head at 16 and the soft water outgoing pipe is connected to the head at 17 (Fig. 6). The uptake pipe 3 leading from the lower part of the tank is connected to the conduit at 18 and the drain pipe 4 makes a connection to the head at 19.

In order to make the necessary connections between these various pipe openings in the conduit head, a disc form of valve, generally indicated at 20, cooperates with openings in a plate 21, these openings communicating with passageways that lead to the various pipe openings 15 to 19 inclusive of the conduit head. The openings in the plate 21 will be described in connection with a typical regeneration cycle, but as shown in Fig. 6, the valve member may comprise a heavy block 22 of hard rubber or similar material, which is backed or contained within a cup-shaped metal member 23 having a hub 24 and carried on a shaft 25. The block 22 is provided with a fairly deep recess 26, this recess having an irregular shape as indicated by the non-cross hatched portions (Figs. 2 to 4) at the center. The block is also provided with a V-shaped notch 27 at the edge, as shown in Figs. 2 to 4, and again as indicated by the lack of cross-section lines. The purpose of this notch will be described in connection with the operation of the recess 26. The block is held within the member 23 by means of a metal plate 27A extending along the bottom of the recess and screwed, as indicated at 28, to the hub member 24.

In order to provide for a brine draw which requires suction, a jet pump, generally indicated at 30, shown in Fig. 7, may be contained within the conduit which carries the threads 15 and leads into the softener tank. This jet pump includes a nozzle 31 which communicates with an opening 32 in the plate 21, the nozzle being positioned in axial alignment with a diffuser tube 33. Thus, when water passes downwardly through the opening 32, as will be described presently, and through the diffuser, a suction is created in the space 34 to draw brine through the pipe 7 out of the tank 8. It is apparent that the lower end of the diffuser 33 is in communication with the interior of the softener tank at a position near the top of the tank.

*Operation of the parts that have been described up to this point and showing a complete regeneration cycle*

Assume that the shaft 25 can be rotated through an arc in any suitable manner, by means of a lever 25A, and further, assume that the recess 26 in the block 22 has substantially the position shown in Fig. 2 which is the position assumed when the softener is performing its normal operation. Hard water enters the valve through the pipe 5, conduit 16 to the port 35 and then flows both ways around the rotor or valve plate to the port 36, then down through the threaded conduit 15 and the attached pipe (not shown) into the mineral bed. The water passing through the bed is caused to give up its hard salts and then it flows in a softened condition out through the lower conduit to the pipe 3.

The water then enters the valve through the conduit 18, port 37 and across the rotor through the recess or cavity and out through the port 38 to the service passageway 17 and pipe 6.

During the same period, and assuming that a previous regeneration has been completed, it is necessary to refill the brine tank. This operation is carried out by leaving the rotor or valve plate in the softening position (Fig. 2), in which case water flows through port 35, then around both sides of the rotor to the port 36 through the down pipe of the softener which is threaded at 15, and then up through the diffuser 33, then out through the passageway 39 (Fig. 7) to the pipe 7 into the brine tank. The valve 10 will remain open until the float level 12 has been raised up to the full level of the tank.

Now assume that the softener needs regeneration and is no longer softening the water, thus indicating that the mineral bed needs to be subjected to the brine solution. The first step is to loosen up the mineral by passing water in a direction upwardly which is opposite to the normal direction of water flow through the bed. The lever 25A then moves the rotor or valve block 22 to the position shown in Fig. 3, so that the water now flows through the pipe 5 and enters the conduit head at 16 into the port 35. The water then flows about both sides of the rotor and enters the port 40 since this port is uncovered by the notch 27 in the rotor. The port is in communication through the passageway 18 with the pipe 3 so that the water now flows downwardly through the pipe up through the mineral bed to the top of the tank where it enters the valve through the port 36 which is partially opened by a slight overlap of the recess 26 in the rotor. The water then flows across the rotor through this recess or passageway down through a small restrictive opening 41 and thence to the drain through the passageway 19 and pipe 4. The small opening 41 meters the water to a desired rate and thereby prevents agitating the mineral too violently.

After the back-wash, it is then desirable to pass brine through the mineral bed in order to remove the salts from the zeolite particles. This is accomplished by again rotating the shaft 25 by the lever 25A so that the rotor or valve plate takes the position shown in Fig. 4. The water again enters the conduit head through the pipe 5 and port 35. The water passes around on both sides of the rotor or valve plate and enters the opening 32 which is now exposed by the V-shaped notch. The water flows through the nozzle 31 (Fig. 7) and the diffuser 33 into the tank, thereby creating a suction at the chamber 34. This suction is sufficient to withdraw brine from the tank 8 through the valve 10, pipe 7, passageway 39 and through the diffuser. Thus service water and brine intermingle at the jet pump and flow downwardly through the softener tank 1 into the mineral bed. This brine solution passes out at the bottom of the tank and upwardly through the pipe 3, entering the valve at the port 40 where it passes through the recess in the rotor to the drain pipe 4.

After the brine solution has cleansed the mineral of the various salts and the lever in the brine tank 8 has dropped to a predetermined position, the valve 10 will have closed to prevent any further brine from passing up through the pipe 7 so that only water now flows through the jet pump 30. The brine which had been previously injected into the mineral bed is effectively rinsed out.

The handle 25A is thereupon moved and the shaft 25 rotated to bring the rotor plate 22 into the softening position which is that shown in Fig. 2, and thereafter the brine tank is refilled in the manner described hereinbefore. The regeneration cycle is therefore complete.

In order to confine the water within a limited area about the rotor 22 and its carrier 20, a relatively large cap-shaped member 42 surrounds the rotor, this member being secured by screws to the conduit head 14. The member 42 is provided with a hub 43 which extends outwardly. A sleeve 44 surrounds the hub. There is a recessed bore 45 within the hub, this bore being provided with a shoulder at 46 against which sets a pair of graphite bearing members 47, 48. An internal groove 49 is provided in the graphite member 47 to collect any water that finds its way along the shaft, and a drain pipe 50 relieves the water. There is a compression spring 51 surrounding the shaft and inserted between the member 48 and the hub 24. The purpose of this spring will be explained presently. A graphite sleeve 52 is interposed between the inwardly extending portion of the hub member 43 and the shaft to serve as a bearing.

There is a thrust ball bearing 53 abutting the flat portion of the hub member 43 and rotatably carrying a sleeve 54. The sleeve 54 has two diametrically disposed openings 57 with three rectangularly positioned edges, but the fourth edge, the one farthest away from the handle 25A as seen in Fig. 6, is provided with a V-shaped configuration. The surfaces of this V represent a camming surface for purposes as will appear presently.

The shaft 25 extends through the sleeve 54 and is pinned or otherwise secured to the handle 25A. There are rollers 58 extending from opposite sides of the shaft through the openings 57 and resting in the apex of the V-shaped slots at both sides of the sleeve 54.

The purpose of the rollers 58 and the camming surfaces on the sleeve 54 will now be explained. Water pressure is always available within the member 42 and the excess of the pressure of this water over that within the recess tends to force the hard rubber block or rotor against the apertured plate 21. With frequent regenerations when it is necessary to rotate the rotor into the various positions shown in Figs. 2, 3 and 4, considerable friction is developed between the hard rubber block and the abutting plate. Moreover, the salts of the water, prior to the time for regeneration, and even the effect of the brine during regeneration, may cause corrosion of the various parts, particularly at the sliding surfaces, which adds to this friction and therefore may necessitate a more frequent renewal of the rubber block or rotor than would normally be necessary. This friction also serves to make it difficult to rotate the shaft 25 by the lever 25A or in any other manner which will be described presently.

In accordance with one of the features of my invention, I propose to lift the block or rotor 22 away from the valve plate a short distance while it is being rotated to the back-wash position (Fig. 3) and the brine draw and rinse position (Fig. 4) during the regeneration cycle. Fig. 6 shows the relative position of the roller 58 with respect to its camming surface in the sleeve 54 when the rotor 22 is in the softening position shown in Fig. 2. Under these circumstances the rotor is forced tightly against the apertured plate by the spring 51 and the effect of the water pressure at the rear side of the carrier 20. However, when the lever 25A is swung to cause the rotor to assume the back-wash position as shown in Fig. 3, the shaft will cause the rollers 58 to ascend one of the camming surfaces and this causes the shaft 25 to draw the block or rotor 22 away from the valve plate. Consequently, at the same instant when the handle is moved in the backwash direction, the rotor makes no contact with the valve plate, and friction at this point is completely relieved.

As the handle 25A is swung still further until the rotor assumes the brine draw and rinse position of Fig. 4, the rollers 58 are still maintained in their detracted position along the camming surface, thus, again, assuring little or no friction between the rotor and its valve plate. The axial movement of the rotor with respect to its apertured plate need only be relatively small so that there is very little leakage at this point and therefore substantially no undesired cross-over of the liquid between the various ports. In other words, the rotor serves selectively to inter-connect the ports during the regeneration cycle and yet little or no friction is developed in making the change-over from one rotor position to another.

While a hand-operated valve may be used on the brine pipe 7 to regulate the amount of brine that is withdrawn from the tank 8, I prefer to employ an automatic float valve of an improved character, as shown in Fig. 5. It is comprised essentially of a valve casing 59 having a nose extension 60 at the top and apertured at 61 to receive a pipe coupling 62. The lower end of the casing has a large aperture which is threaded to receive a cap 63 having a pipe coupling 64. Directly above the coupling 64 there is a flap valve 65 of rubber, screwed as indicated at 66 to the cap 63.

Approximately midway of the casing there is a web 67 having a threaded opening which, in turn, receives a threaded core 68 provided with a number of longitudinally extending openings 69. The core has a central bore for loosely receiving a rod 70. A valve bobbin 71 is secured to the rod or shaft 70 and this bobbin is provided at both ends with face plates 72 of rubber. The upper end of the shaft or rod 70 is journaled in a plug 73 which is screwed to a web on the casing 59 and is provided with a plurality of longitudinally extending openings 74.

At a position between the web 67 and the cap member 63 there is a tapered pipe or coupling 75 terminating in a head 76, about which is fitted a slitted rubber nipple 77. The lower end of the rod 70 is connected through links 78 to a swivel member 79 pivoted at the pin 80 to a rod 81 extending transversely out of the casing 59. A cap screw 82 is fitted in the casing and a metal ring member 83 surrounds the rod 81 where it passes through the cap screw. The rod is pivoted at 84 to a rectangularly shaped lever 85 having screws 86 projecting inwardly to contact with flattened surfaces 87 on the rod 81 when the member 85 is rocked in the vertical direction. The latter is provided with a hub 88 for receiving a rod 89 connected to a float 12.

In operation, when the brine tank 8 is full, the float 12 will have been caused to rise and the screw 86 will be caused to contact the upper flat surface 87 of the rod 81. The latter will cause the rod 70 to be lowered and thereby cause the lower plate 72 to close off the apertures 69 so that flow of water through the pipe 7 and the coupling 62 is stopped at the web 67.

However, during the regeneration cycle, when brine is passing up through the pipe 7 through the suction effects exerted at the chamber 34 (Fig. 7), the float 12 will have been lowered and the lower screw 86 will now contact the flattened portion of the rod 81 to raise the rod 70 and thus to expose the openings 69. The upper plate 72 will actually contact the plug 73 to close off the openings 74 only when the float 12 will have reached its lowermost position to indicate that sufficient brine has been carried upwardly through the pipe 7. It is apparent that the flap valve 65 will raise during these suction effects.

It is pointed out that the water in the brine tank 8 enters the pipe 11 at the lower horizontal slot in the pipe and the latter is connected to the coupling 64 as is well known in the art. The slitted nipple 77 allows the ejection of liquid at the slit but does not allow liquid to enter.

It is evident that the float valve 10, as shown in Fig. 5, serves to control the amount of brine that passes up through the pipe 7 since the plate 72 will have cut off the opening 74 when the predetermined quantity of brine has been conveyed into the softener tank 1. The float valve also controls the amount of water that is conveyed into the brine tank because the lower plate 72 will have cut off the openings 69 when the float has reached its predetermined full tank level.

While my invention applies to a fully hand-operated regeneration structure, as when the lever 25A is swung completely by hand at predetermined time intervals, I prefer to apply the principles of the invention to a semi-automatic softener. It is in softeners of this type which have a present appeal, that the alleviation of friction between the valve block or rotor 22 and the apertured plate 21 finds particular utility. This is because in the case of a fully manually operated device, any excess friction can be accommodated by applying extra force on the lever 25A and at least the structure would operate, though quite inefficiently. But in the case of a semi-automatic softener, as when the lever 25A is moved to its back-wash, brine draw and rinse positions, automatically by time control, all sources of friction must be removed, for otherwise the force available would not be sufficient to accomplish regeneration.

The force required to move the rotor or valve block to the position shown in Figs. 3 and 4 is obtained from a pair of tension springs 90 having one of their ends connected to rod 91 which are secured to opposite sides of the sleeve 54. The opposite ends of the springs are secured as at 92 to a casing 93. The sleeve 54 carries a bar 94 fixed thereto and which is adapted to actuate the make and break contact of a microswitch 95. A pawl or dog 96 is pivoted as at 97 to the bottom of the casing 93, the pawl having notched shoulders 98, 99 at the respective ends. These shoulders are for the purpose of engaging the bar 94 in a time sequence as will be described presently.

A movable core 100 is swivelly attached, as at 101 to the pawl 96, this core being adapted to reciprocate within a solenoid 102. The general purpose of the apparatus contained within the casing 93 is to permit the lever 25A to be swung to a position from the vertical or A position as shown in Fig. 1, to the horizontal or B position, at which time the valve block or rotor 22 will assume the back-wash position shown in Fig. 3.

This is a manual operation and, in fact, is the only operation of this character during the entire regeneration cycle. At this time the bar 94 will have been caused to move to a position directly opposite the notch 99 of the pawl 96 (Fig. 8) and due to the urge of the spring 103 the pawl will be caused to move inwardly to hold the bar 94 in the horizontal handle position. At this time, a timer control is started which will be described presently, the control running for approximately 20 minutes and then the solenoid 102 is energized to pull up its core 100 and release the bar 94 from the notch 99. Due to the pull of the springs 90 which tends to rotate the bar 94 clockwise, as seen in Fig. 8, this bar is now caught by the notch 98 of the pawl 96 and retained in that position for approximately 60 minutes, as determined by the time control device. At this time the rotor or valve block 22 will be in the position shown in Fig. 4 of brine draw and rinse.

At the end of the 60 minute interval, the timing device now serves to de-energize the solenoid 102, causing the pawl 96 to move counter-clockwise about its swivel 97 and thereby release the bar 94. The springs 90 thereupon cause the bar, the sleeve 54 and the shaft 25 to move to the position shown in Fig. 8, which is the normal operating softening position illustrated diagrammatically in Fig. 2. It will be noted that the bar 94 at this time has contacted the make and break element of the microswitch 95.

The time control apparatus will now be described with particular reference to Figs. 8, 9, 10 and 11. There is a motor 104 contained within the casing 93 and geared through a gear train (not shown) to an output shaft 105 on which is mounted a cam 106. This cam has a depression 107 therein and the speed of the cam is so regulated by the gear train that the depression represents a 20 minute interval and the rest of the cam represents a 60 minute interval, as shown at the lower right-hand corner of Fig. 8. There is a roller 108 spring-pressed against the cam and this roller is secured to an actuator of a make and break switch 109 of any suitable and well known type. This switch is connected in series with the solenoid 102, as shown in Figs. 9, 10 and 11 and across the line 110. The microswitch 95 is in series with the motor 104 and these are also connected across the line.

The microswitch 95 is so arranged that when its external actuator is de-pressed the switch is effectively opened so that the motor 104 is de-energized and the time control has not started. This is the condition shown in Fig. 8 which, as explained hereinbefore, is the softening position illustrated diagrammatically in Fig. 2. But when the lever 25A is rotated counter-clockwise (Fig. 1) to its horizontal position B and the bar 94 has been moved into contact with the notch 99 of the pawl 96, the circuit in the microswitch 95 is closed and the motor 104 starts to run, carrying with it the cam 106. Assuming that the roller 108 has just started to enter the depression or recess 107 and the cam rotates clockwise, as indicated in Fig. 8, the switch 109 will remain de-energized as indicated in Fig. 10.

Now assume that the roller leaves the depression 107 at the end of 20 minutes, as determined by the rotation of the cam, the switch 109 will now be closed to cause the solenoid 102 to become energized. Thus the bar 94 will be released from the notch 99 and the lever 25A will assume its C position as shown in Fig. 1 when the brine draw and rinse operation starts. At the end of the 60 minute interval, the roller 108 will again enter the depression 107 and open the switch 109 to de-energize the solenoid, allowing the bar 94 to become disengaged from the knob 98 (Fig. 8) and to return the handle to the vertical A position which is the softening position diagrammatically illustrated in Fig. 2. At this time the microswitch 95 will have been contacted by the bar 94 to open the motor circuit, which is the condition shown in Fig. 9. Thus, the softener as a whole utilizes electrical energy only during the regeneration cycle which at most takes approximately 80 minutes, as determined by the rotary movement of the cam 106.

In order to time the cam with the mechanical operation of the levers, an adjustment knob 111 is brought out from the gear train in order to vary the angular position of the cam.

From the foregoing it is evident that I have invented an improved form of water softener which can be operated either semi-automatically or by hand and in which all causes of friction and wear between the rotor or valve block and the apertured plate are removed without in any manner reducing the fluid flow efficiency of the device and this improvement is particularly important in the case of semi-automatic water softeners in which the actuating force is of limited amount. The improvement is such that water of any degree of hardness, or containing corrosive materials in solution, will have little or no effect on the ease with which the rotary parts can be automatically manipulated, even over long periods of time, thus lending considerable reliability to the softener as a whole.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described by invention, what I claim as new and desire to secure by Letters Patent, is:

1. A time control valve comprising an apertured plate, a recessed valve block, means for urging said valve block into face to face contact with said plate, a shaft secured to the valve block for rotating the block, a plurality of arms secured to said shaft and angularly positioned with respect to one another, means including a spring attached to one of said arms for urging the shaft to rotate, means for restraining rotation of the shaft during a predetermined period of time, said last mentioned means including a pawl, an electromagnet, a switch and a timing motor, said pawl being pivotally mounted and having a notch on each side of the pivot, said electromagnet having an armature attached to said pawl, said circuit having a switch and connected to said electromagnet, the other of said arms being adapted, when the shaft is rotated, to be received successively by the notches in said pawl, and means including said timing motor for opening and closing the switch of the electromagnet to cause the pawl to swing about its pivot and present one or the other of its notches to one of the arms secured to said shaft.

2. A time control valve comprising an apertured plate, a recessed valve block, means for urging said valve block into face to face contact with said plate, a shaft secured to the valve block for rotating the block, a plurality of arms secured to said shaft and angularly positioned with respect to one another, means including a spring attached to one of said arms for urging the shaft to rotate, means for restraining rotation of the shaft during a predetermined period of time, said last mentioned means including a pawl, an electromagnet, a switch and a timing motor, said pawl being pivotally mounted and having a notch on each side of the pivot, said electromagnet having an armature attached to said pawl, said circuit having a switch and connected to said electromagnet, the other of said arms being adapted, when the shaft is rotated, to be received successively by the notches in said pawl, said timing motor having a shaft, a cam and follower associated therewith, said follower being mechanically connected to said switch to open and close the same at predetermined intervals and thereby control the operation of the electromagnet and pawl.

3. A time control valve comprising an apertured plate, a recessed valve block, means for urging said valve block into face to face contact with said plate, a shaft secured to the valve block for rotating the block, a plurality of arms secured to said shaft and angularly positioned with respect to one another, means including a spring attached to one of said arms for urging the shaft to rotate, means for restraining rotation of the shaft during a predetermined period of time, said last mentioned means including a pawl, an electromagnet, a switch and a timing motor, said pawl being pivotally mounted and having a notch on each side of the pivot, said electromagnet having an armature attached to said pawl, said circuit having a switch and connected to said electromagnet, the other of said arms being adapted, when the shaft is rotated, to be received successively by the notches in said pawl, and cam means secured to the motor for controlling the operation of the electromagnet through said switch, whereby the pawl is caused to swing about its pivot and present one or the other of its notches to one of the arms secured to said shaft.

4. A time control valve comprising an apertured plate, a recessed valve block, means for urging said valve block into face to face contact with said plate, a shaft secured to the valve block for rotating the block, a plurality of arms secured to said shaft and angularly positioned with respect to one another, means including a spring attached to one of said arms for urging the shaft to rotate, means for restraining rotation of the shaft during a predetermined period of time, said last mentioned means including a pawl, an electromagnet, a switch and a timing motor, said pawl being pivotally mounted and having a notch on each side of the pivot, said electromagnet having an armature attached to said pawl, said circuit having a switch and connected to said electromagnet, the other of said arms being adapted, when the shaft is rotated, to be received successively by the notches in said pawl, means including said timing motor for opening and closing the switch of the electromagnet to cause the pawl to swing about its pivot and present one or the other of its notches to one of the arms secured to said shaft, and means for automatically de-energizing said motor at the end of the predetermined period of time, said last mentioned means comprising a switch connected in the motor circuit, said last mentioned switch being positioned in the path of the arm after it leaves the notches of the pawl.

5. A time control valve comprising an apertured plate, a valve block having recesses of different shapes, means for urging the recessed face of said block into contact with said plate, a shaft secured to the valve block, means for applying a continuous rotary effort to the shaft so as to bring the recesses of the valve block successively into register with the apertures of the plate, means for restraining the movement of said valve block at a predetermined position, said means including an arm secured to said shaft, a pivoted pawl having at least one notch adapted to receive said arm, and means including a time controlled electromagnet for actuating said pawl about its pivot to release the arm.

6. A time control valve comprising an apertured plate, a valve block having recesses of different shapes, means for urging the recessed face of said block into contact with said plate, a shaft secured to the valve block, means for applying a continuous rotary effort to said shaft so as to bring the recesses of the valve blocks successively into register with the apertures of the plate, means for restraining the movement of said valve block at two predetermined positions, said means including an arm secured to the shaft, a pivoted pawl having notches at opposite ends of the pawl and adapted successively to receive said arm, and means including a time controlled electromagnet for actuating said pawl about its pivot at predetermined times to release the arm successively from each of said notches in order to bring different recesses of the valve block into register with the apertures of the plate.

WALSTINE C. ROGERS.

References Cited in the file of this patent

UNITED STATES PATENTS

| Number | Name | Date |
|---|---|---|
| 1,920,973 | Dinzl | Aug. 8, 1933 |
| 1,938,628 | Huppertz | Dec. 12, 1933 |
| 2,051,155 | Staegemann | Aug. 15, 1936 |
| 2,052,515 | Pick | Aug. 25, 1936 |
| 2,222,626 | Mueller et al. | Nov. 26, 1940 |
| 2,311,989 | McGill | Feb. 23, 1943 |
| 2,360,321 | Griswold | Oct. 17, 1944 |
| 2,449,733 | Wilkening | Sept. 21, 1948 |
| 2,478,702 | Moody | Aug. 9, 1949 |
| 2,498,189 | Wattson | Feb. 21, 1950 |
| 2,503,612 | Burkhardt | Apr. 11, 1950 |
| 2,510,494 | Bowan et al. | June 6, 1950 |
| 2,529,544 | Ebert | Nov. 14, 1950 |
| 2,541,715 | Oestreicher | Feb. 13, 1951 |